United States Patent
Lan

(10) Patent No.: US 10,386,021 B2
(45) Date of Patent: Aug. 20, 2019

(54) LED LIGHT

(71) Applicant: Shenzhen Guanke Technologies Co., Ltd., Shenzhen (CN)

(72) Inventor: Qing Lan, Shenzhen (CN)

(73) Assignee: SHENZHEN GUANKE TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 15/835,302

(22) Filed: Dec. 7, 2017

(65) Prior Publication Data

US 2019/0162371 A1 May 30, 2019

(30) Foreign Application Priority Data

Nov. 27, 2017 (CN) .......................... 2017 1 1205496

(51) Int. Cl.

| F21K 9/238 | (2016.01) |
| F21K 9/232 | (2016.01) |
| F21K 9/66 | (2016.01) |
| F21V 31/00 | (2006.01) |
| F21V 23/02 | (2006.01) |
| F21V 29/83 | (2015.01) |
| F21V 29/77 | (2015.01) |

(Continued)

(52) U.S. Cl.

CPC .............. *F21K 9/238* (2016.08); *F21K 9/232* (2016.08); *F21K 9/237* (2016.08); *F21K 9/66* (2016.08); *F21V 19/0035* (2013.01); *F21V 23/001* (2013.01); *F21V 23/003* (2013.01); *F21V 23/02* (2013.01); *F21V 29/773* (2015.01); *F21V 29/777* (2015.01); *F21V 29/83* (2015.01); *F21V 31/005* (2013.01); *F21V 23/0464* (2013.01); *F21Y 2103/10* (2016.08); *F21Y 2115/10* (2016.08); *H05B 37/0263* (2013.01); *H05B 37/0272* (2013.01)

(58) Field of Classification Search

CPC . F21K 9/238; F21K 9/66; F21K 9/232; F21K 9/237; F21V 29/773; F21V 29/777; F21V 29/83; F21V 19/0035; F21V 23/001; F21V 23/003; F21V 23/02; F21V 31/005

See application file for complete search history.

(56) References Cited

U.S. PATENT DOCUMENTS

| 8,847,436 | B2 * | 9/2014 | Maxik | ...................... | H01F 38/14 |
| | | | | | 307/104 |
| 2014/0328064 | A1 * | 11/2014 | Mikami | .................. | F21V 29/74 |
| | | | | | 362/249.01 |
| 2016/0245462 | A1 * | 8/2016 | Demuynck | ........... | F21V 19/003 |

* cited by examiner

*Primary Examiner* — Anh T Mai
*Assistant Examiner* — Nathaniel J Lee

(57) ABSTRACT

An LED light includes a holder, a connecting member, a first case, a second case, a power supply, a connecting plate, a heat sink and a base. The power supply includes a spring and an inducting portion. The connecting member includes a cylindrical hole for receiving the spring therein to connect the connecting member with the power supply, and the base includes an induction module for inducting with the inducting portion to drive the LED light lighting or extinguishing. The connecting plate includes a housing and a post portion, and the heat sink includes a plurality of cooling units to form an aperture, a through-hole receiving the post portion therein and a connecting tube received in the through-hole. The present disclosure is simple, portable and high heat dissipation effect, and can automatically intelligent sense the ambient environment to determine lighting conditions and improve induction by adjusting the induction module and the inducting portion.

20 Claims, 6 Drawing Sheets

(51) Int. Cl.
   *F21V 23/00*      (2015.01)
   *F21V 19/00*      (2006.01)
   *F21K 9/237*      (2016.01)
   *H05B 37/02*          (2006.01)
   *F21V 23/04*          (2006.01)
   *F21Y 103/10*         (2016.01)
   *F21Y 115/10*         (2016.01)

LED LIGHT

BACKGROUND

1. Technical Field

The present disclosure generally relates to light sources field, and especially relates to a Light-Emitting Diode (LED) light.

2. Description of Related Art

In the usage of LED lights, users usually need a light which not only can save energy, but also can meet the requirement of illumination. At the same time, it is also hoped that the installation of the lights is convenient, and a same light can be used for many different illumination situations, even in wet conditions. However, a single light on the market is hardly difficult to simultaneously meet the basic requirements, thereby it is necessary to select more kinds of lights or light control devices to meet a qualified lighting scheme. So, it is very inconvenient for the purchase and maintenance of the lights. Furthermore, for an illumination device with such LED light, heat dissipation is a main factor should be considered. If the LED light device with a poor heat dissipation may lower the lifespan of the LED light device. Ventilation cooling is a good way to heat dissipation of the LED light device. A heat sink of a conventional LED light is not only heavy, but also the heat dissipation effect of the heat sink is not good due to the small space inside the heat sink. In addition, the conventional LED light is fixed by screws which required drilling tapping during assembly, thereby the assembly process is complex, the assembling speed is lowered and the cost is increased.

The present disclosure provides an intelligent lighting system for LED lights with high efficiency and energy saving which may automatically intelligent sense the ambient environment to determine the LED light going on or going out, and it also can select a sensing angle with different demands by an adjustable automatic sensing module according to different illumination situations when installing the LED light, which can be more accurate to realize the illumination of the LED light at a fixed time and location. The range of the induction angle is achieved in 360 degree range, thereby all kinds of corridors, three-way/four-way intersections, corners, sloping stairs can efficiently receive the induction signals. Meanwhile, a simple waterproof structure is designed on the LED light to meet the needs of wet conditions, which is portable, simple, high heat dissipation effect and wide to use.

SUMMARY

The present disclosure relates to an LED light which may automatically intelligent sense the ambient environment to determine going on or going out the LED light, and improve induction by adjusting the induction module and the inducting portion, and is simple, easy to carry and high heat dissipation effect.

In one aspect, an LED light includes: a holder, a connecting member, a first case, a second case, a power supply, a heat sink, a connecting plate and a base. The connecting member is movably connected to the holder and includes a cylindrical hole therein, and the first case includes a mounting block thereon. The second case includes a mounting hole to engage with the corresponding mounting block for fixing the first case with the second case. The power supply is received in a receiving room formed between the first case and the second case and includes a plurality of springs to cooperatively form a circle therebetween and insert into the cylindrical hole for connecting the power supply with the connecting member, and an inducting portion configured for adjusting its axial induction angle by rotating the connecting member. The heat sink includes a plurality of cooling units, a through-hole cooperatively formed by the plurality of cooling units and a connecting tube connected to the plurality of cooling units. The connecting plate includes a housing and a post portion extending downward from the middle portion of the housing along a vertical direction thereof, one end of the connecting plate connected to the second case and the other end of the connecting plate connected to the heat sink. The base includes an induction module configured for realizing the rotation of the axial vertical plane relative to the base and inducting with the inducting portion each other to drive the LED light go on or go out. An aperture is formed among the plurality of cooling units, the connecting tube is received in the through-hole and the post portion is inserted into the through-hole.

Wherein the cooling unit includes a connecting portion connected to the connecting tube, a fixing portion tightly connected to the connecting plate and perpendicular to the connecting portion, and a pair of cooling plates symmetrical with each other relative to the fixing portion.

Wherein the LED light further includes a first light plate and a lampshade, the fixing portion including a first recess and a rib, the first light plate slidably inserted into the first recess and then received in the first recess, the lampshade engaged with the rib to enclose the first recess.

Wherein the lampshade includes a fixing sidewall resisting on the first light plate when the lampshade is fastened with the rib.

Wherein the LED light further includes a wiring plate connected between the second case and the connecting plate and electrically connected to the first light plate and the power supply, the first light plate passing through the connecting plate and the wiring plate in turn when assembly the LED light.

Wherein the LED light further includes a second light plate perpendicular to the first light plate and fixed at an end of the heat sink to connect with the connecting tube.

Wherein the connecting portion includes a second recess parallel to the first recess, the second recess including a wiring post passing through the connecting plate, the wiring plate in turn, one end of the wiring post electrically connected to the second light plate and the other end of the wiring post electrically connected to the wiring plate.

Wherein the LED light further includes a baseboard fixed with the base, the base including a mounting portion, each of the second light plate and the baseboard including an installing hole to engage with the mounting portion for fixing the base, the baseboard, the second light plate together with the heat sink.

Wherein the base includes a plurality of cooling holes formed on the middle thereof to heat dissipation, and a plurality of outlets formed at the inside periphery thereof.

Wherein the first case includes a sliding groove and the connecting member includes a limiting block configured for limiting the sliding travel of the connecting member in the sliding groove.

Wherein a plurality of mounting blocks is formed in the inside of the first case to cooperatively enclose a ring, a plurality of mounting holes is formed in inside of the second case to engage with the corresponding mounting blocks; the spring including a post and the cylindrical hole including a plurality of racks arranged at interval, the power supply connected with the connecting member via the post engaging with the rack under the elastic force of the spring.

Wherein the signal between the induction module and the inducting portion is transmitted from a physical gateway in a wireless network by means of a power carrier PLC so as to go on or go out the LED light by sending an instruction to the power supply, while the wireless network is passed to the physical gateway through a cloud gateway service.

Wherein the heat sink is a cylindrical structure with an internal hollow and the connecting cylinder is a circular structure with an inner hollow, the length of the connecting tube in the axial direction of the heat sink is smaller than that of the through-hole.

In another aspect, an LED light according to an exemplary embodiment of the present disclosure includes a holder, a connecting member movably connected to the holder, a first case connected to the bottom of the connecting member, a second case received in the first case and a receiving room formed between the first case and the second case, a power supply received in the receiving room, a connecting plate, a heat sink and a base connected to the bottom of the heat sink. The connecting member includes a cylindrical hole thereon. The power supply includes a plurality of springs to cooperatively form a circle therebetween and insert into the cylindrical hole for connecting the power supply with the connecting member, and an inducting portion configured for adjusting its axial induction angle by rotating the connecting member. The first case includes a plurality of mounting blocks thereon, and the second case includes a plurality of mounting holes to engage with the corresponding mounting blocks for fixing the first case with the second case. The base includes an induction module configured for realizing the rotation of the axial vertical plane relative to the base and inducting with the inducting portion each other to drive the LED light go on or go out. The heat sink includes a plurality of cooling units, a through-hole cooperatively formed by the plurality of cooling units and a connecting tube connected to the plurality of cooling units and received in the through-hole, an aperture formed among the plurality of cooling units. The connecting plate includes a housing and a post portion extending downward from the middle portion of the housing along a vertical direction thereof to insert into the through-hole, one end of the connecting plate connected to the bottom of the second case and the other end of the connecting plate connected to the heat sink. The rotation angle range of both the connecting member and the inducting portion is from zero degree to 360 degree, the induction angle of the inducting portion is 180 degree, and the rotation angle range of the induction module relative to the base is from zero degree to 150 degree.

Wherein the first case includes a sliding groove and the connecting member includes a limiting block configured for limiting the sliding travel of the connecting member in the sliding groove, the plurality of mounting blocks formed in the inside of the first case to cooperatively enclose a ring; the spring including a post and the cylindrical hole including a plurality of racks arranged at interval, the power supply connected with the connecting member via the post engaging with the rack under the elastic force of the spring.

Wherein the heat sink is a cylindrical structure with an internal hollow and the connecting cylinder is a circular structure with an inner hollow, the length of the connecting tube in the axial direction of the heat sink smaller than that of the through-hole; the cooling unit including a connecting portion connected to the connecting tube, a fixing portion tightly connected to the connecting plate and perpendicular to the connecting portion, and a pair of cooling plates symmetrical with each other relative to the fixing portion.

Wherein the LED light further includes a first light plate, a second light plate, a lampshade and a wiring plate, the fixing portion including a first recess and a rib, the first light plate slidably inserted into the first recess and then received in the first recess, the lampshade engaged with the rib to enclose the first recess; the second light plate perpendicular to the first light plate and fixed at an end of the heat sink to connect with the connecting tube, the lampshade including a fixing sidewall resisting on the first light plate when the lampshade is fastened with the rib; the wiring plate connected between the second case and the connecting plate and electrically connected to the first light plate and the power supply, the first light plate passing through the connecting plate and the wiring plate in turn when assembly the LED light.

Wherein the connecting portion includes a second recess parallel to the first recess, the second recess including a wiring post passing through the connecting plate, the wiring plate in turn, one end of the wiring post electrically connected to the second light plate and the other end of the wiring post electrically connected to the wiring plate.

Wherein the LED light further includes a baseboard fixed with the base, the base including a mounting portion, each of the second light plate and the baseboard including an installing hole to engage with the mounting portion for fixing the base, the baseboard, the second light plate together with the heat sink; while the base includes a plurality of cooling holes formed on the middle thereof to heat dissipation, and a plurality of outlets formed at the inside periphery thereof.

Wherein the signal between the induction module and the inducting portion is transmitted from a physical gateway in a wireless network by means of a power carrier PLC so as to go on or go out the LED light by sending an instruction to the power supply, while the wireless network is passed to the physical gateway through a cloud gateway service.

The present disclosure provides the advantages as below.

Firstly, Such configuration of the inducting portion is mounted on the power supply for adjusting its axial induction angle by rotating the connecting member, the induction module of the base is configured for realizing the rotation of the axial vertical plane relative to the base and inducting with the inducting portion each other to drive the LED light go on or go out, an intelligent lighting system for LED lights with high efficiency and energy saving is provided, which may automatically intelligent sense the ambient environment to determine the LED light going on or going out, and it also can select a sensing angle with different demands by the adjustable automatic sensing module according to different illumination situations when installing the LED light, thereby it can be more accurate to realize the illumination of the LED light at a fixed time and location.

Secondly, such configuration of the mounting block is defined in the first case, and the mounting hole is correspondingly defined in the second case to engage with the mounting block for fixing the first case with the second case by ultrasonic fixing technology rather than by screws. Comparing to fix by screws, such assembly above is not required drilling tapping, thereby the assembly process is simple, the assembling speed is improved and the cost is decreased.

Thirdly, all the plurality of cooling units, the through-hole surrounded by the plurality of cooling units, the aperture formed among the plurality of cooling units, and the connecting tube connected to the plurality of cooling units and received in the through-hole are mounted on the heat sink, thereby the center of the heat sink is sunk, the heat dissipation effects is improved, the overall volume of the heat sink is reduced and the overall structure is stable.

DETAILED DESCRIPTION

Figure 1:
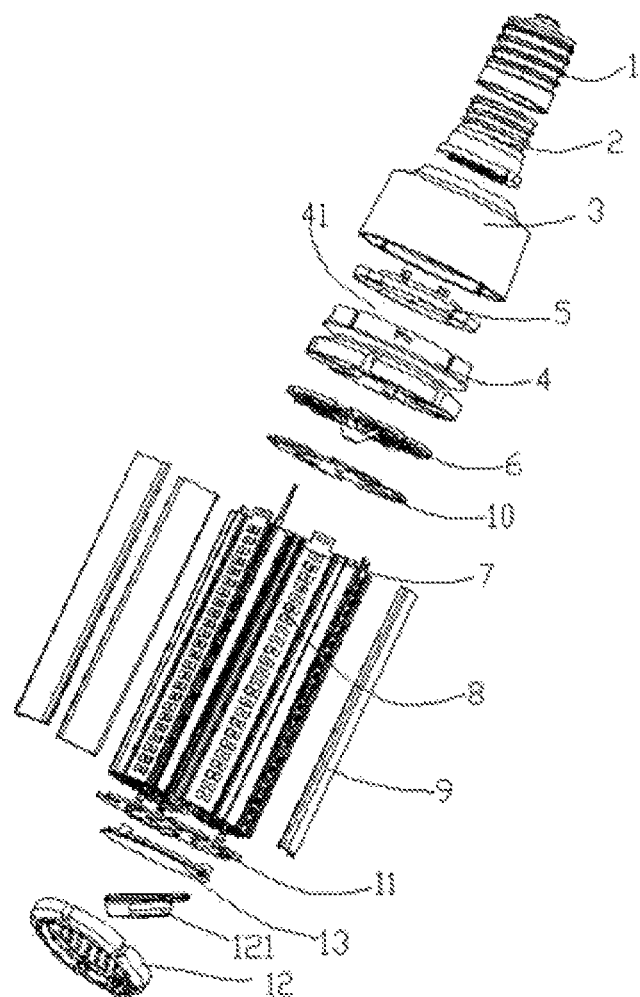
FIG. 1 is an exploded schematic view of the LED light in accordance with an exemplary embodiment.
Figure 2:
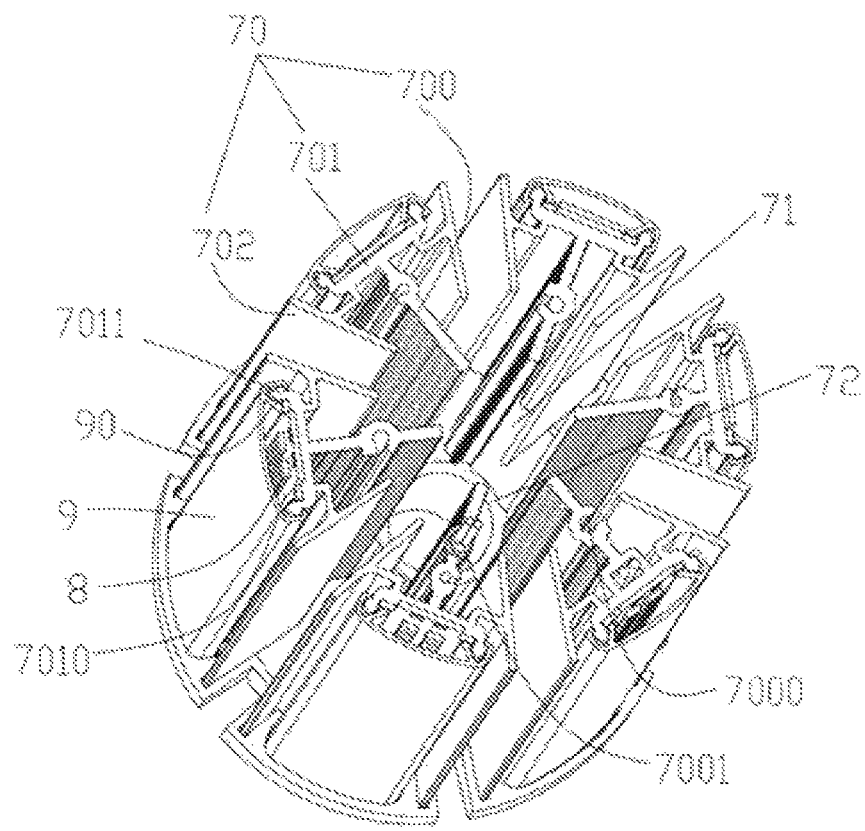
FIG. 2 is an assembly schematic view of a heat sink, a first light plate and a lampshade of the LED light of FIG. 1.
Figure 3:
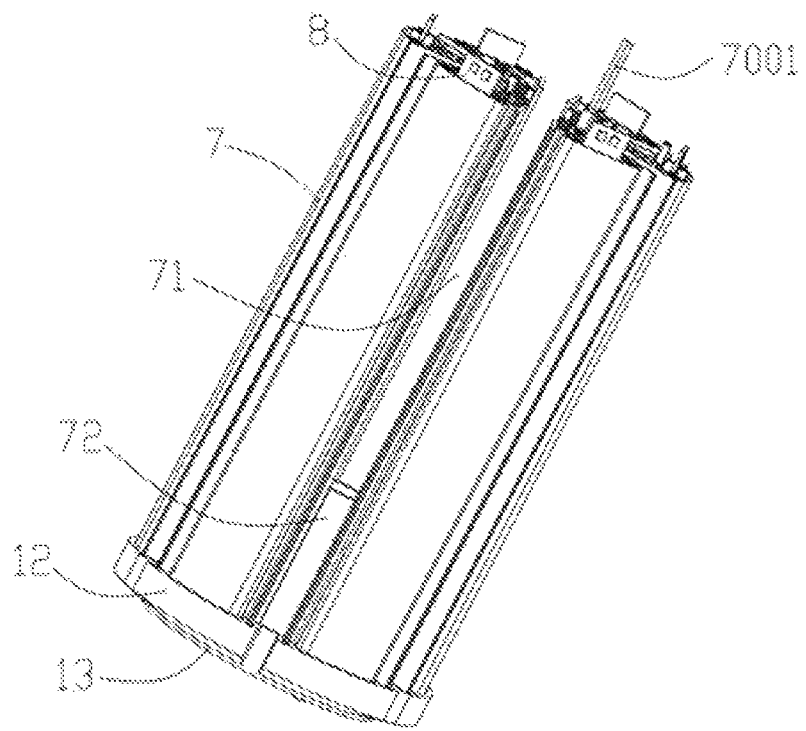
FIG. 3 is an assembly schematic view of the heat sink, the first light plate, a base and a baseboard of the LED light of FIG. 1.
Figure 4:
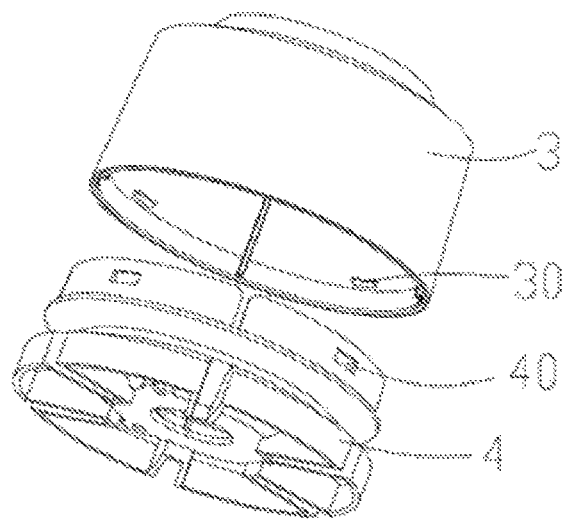
FIG. 4 is an exploded schematic view of a first case and a second case of the LED light of FIG. 1.
Figure 5:
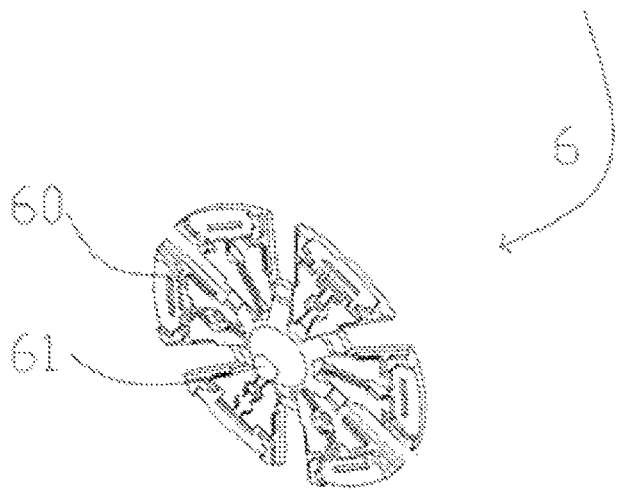
FIG. 5 is a schematic view of a connecting plate of the LED light of FIG. 1.
Figure 6:
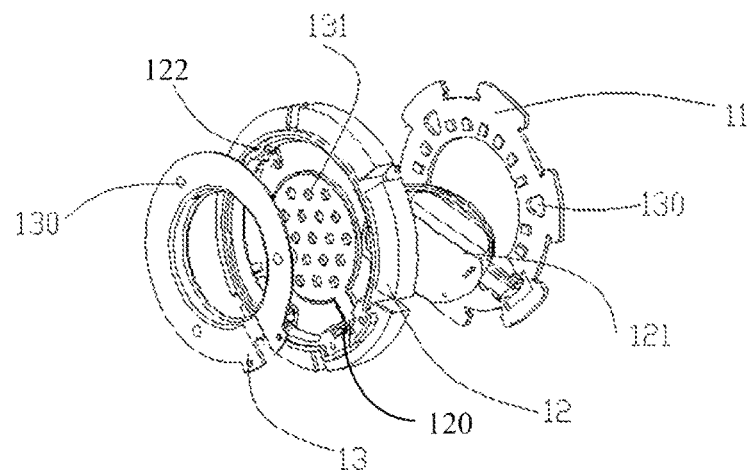
FIG. 6 is an exploded schematic view of the base and the baseboard of the LED light of FIG. 1.
Figure 7:
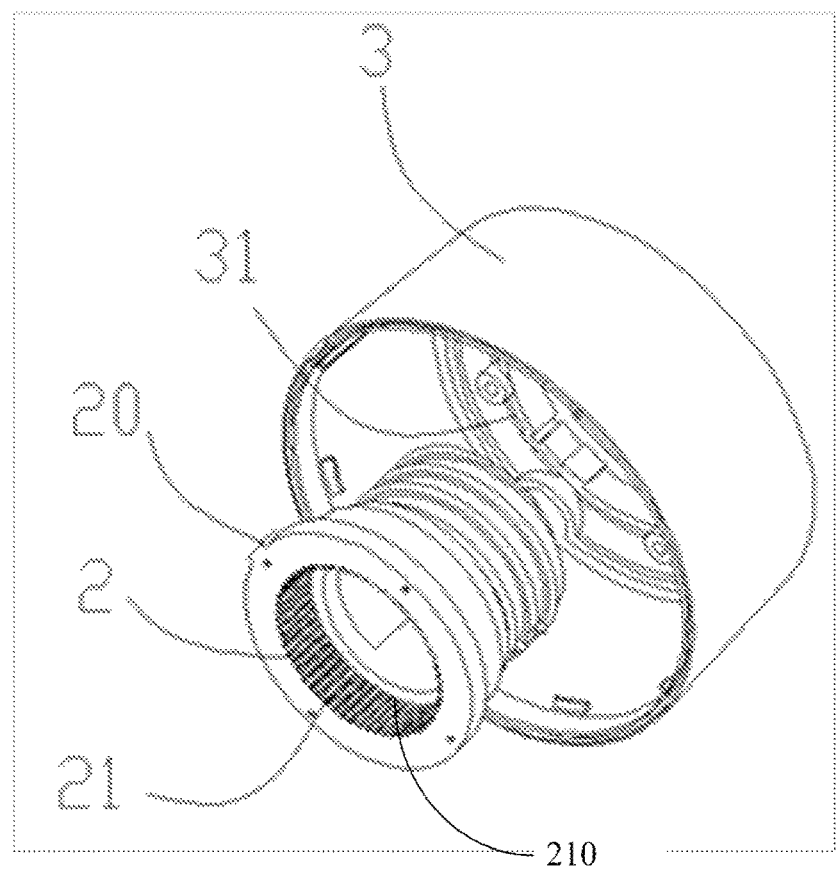
FIG. 7 is an exploded schematic view of the first case and a connecting member of the LED light of FIG. 1.
Figure 8:
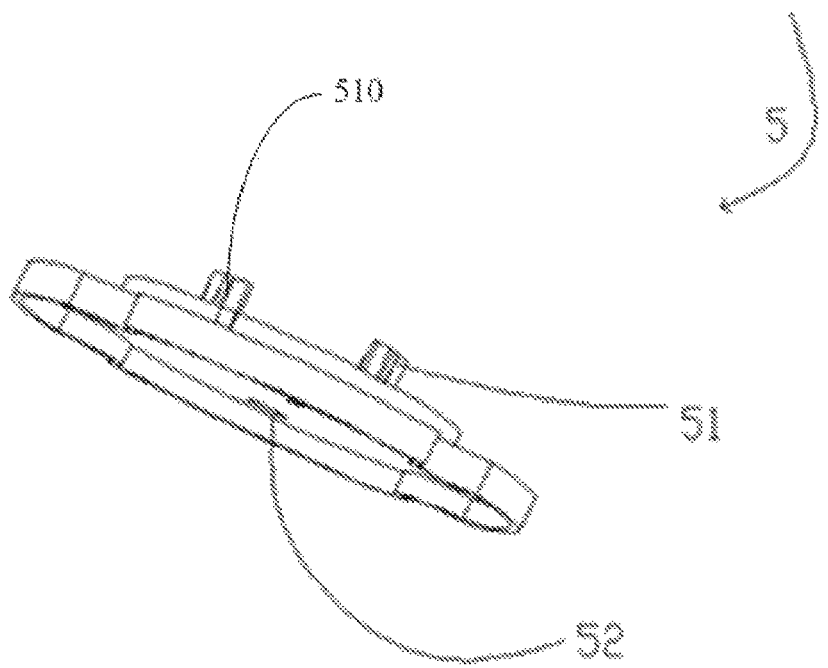
FIG. 8 is a schematic view of a power supply of the LED light of FIG. 1.

The disclosure is illustrated by way of example and not by way of limitation in the figures of the accompanying drawings, in which like reference numerals indicate similar elements.

Referring to FIGS. 1-8, the LED light includes a holder 1, a connecting member 2 movably connected to the holder 1, a first case 3, a second case 4, a power supply 5, a connecting plate 6, a heat sink 7 and a base 12. The first case 3 is connected to the bottom of the connecting member 2, the second case 4 is received in the first case 3 so that a receiving room 41 is formed between the first case 3 and the second case 4. The power supply 5 is received in the receiving room 41. One end of the connecting plate 6 is connected to the bottom of the second case 4 and the other end of the connecting plate 6 is connected to the heat sink 7. The base 12 is connected to the bottom of the heat sink 7. The connecting member 2 includes a cylindrical hole 21 therein. The power supply 5 includes a plurality of springs 51 to cooperatively form a circle therebetween and insert into the cylindrical hole 21 for connecting the power supply 5 with the connecting member 2, and an inducting portion 52 configured for adjusting its axial induction angle by rotating the connecting member 2. The base 12 includes an induction module 121 configured for realizing the rotation of the axial vertical plane relative to the base 12 and inducting with the inducting portion 52 each other to drive the LED light go on or go out. The first case 3 includes a plurality of mounting blocks 30 thereon. The second case 4 includes a plurality of mounting holes 40 to engage with the corresponding mounting blocks 30 for fixing the first case 3 with the second case 4. The connecting plate 6 includes a housing 60 and a post portion 61 extending downward from the middle portion of the housing 60 along a vertical direction thereof. The heat sink 7 includes a plurality of cooling units 70, a through-hole 71 cooperatively formed by the plurality of cooling units 70 and a connecting tube 72 connected to the plurality of cooling units 70 and received in the through-hole 71. An aperture 703 is formed among the plurality of cooling units 70, and the post portion 61 is inserted into the through-hole 71.

In the exemplary embodiment of the present disclosure, the spring 51 includes a post 510 and the cylindrical hole 21 includes a plurality of racks 210 arranged at interval. The power supply 5 is connected with the connecting member 2 via the post 510 engaging with the rack 210 under the elastic force of the spring 51. Such assembly is simple, fast and stable.

In the exemplary embodiment of the present disclosure, the rotation angle range of both the connecting member 2 and the inducting portion 52 is from zero degree to 360 degree. The induction angle of the inducting portion 52 is 180 degree, and the rotation angle range of the induction module 121 relative to the base 12 is from zero degree to 150 degree. The induction module 121 is inducted with the inducting portion 52 each other to cover and detect the surrounding environment at the range between zero degree and 360 degree. When a person or a moving object enters the sensing area, the light system starts the light-on mode to last for a certain period of time. After a certain period of time, the light system starts the light-off mode when it can't detect any moving object. After a certain period of time, the light system will continue to activate a next light-on mode when the moving object is again detected to move. The present disclosure may automatically intelligent sense the ambient environment to determine the LED light going on or going out, and it also can select a sensing angle with different demands by the adjustable automatic sensing module according to different illumination situations when installing the LED light, thereby it can be more accurate to realize the illumination of the LED light at a fixed time and location.

Figure 9:
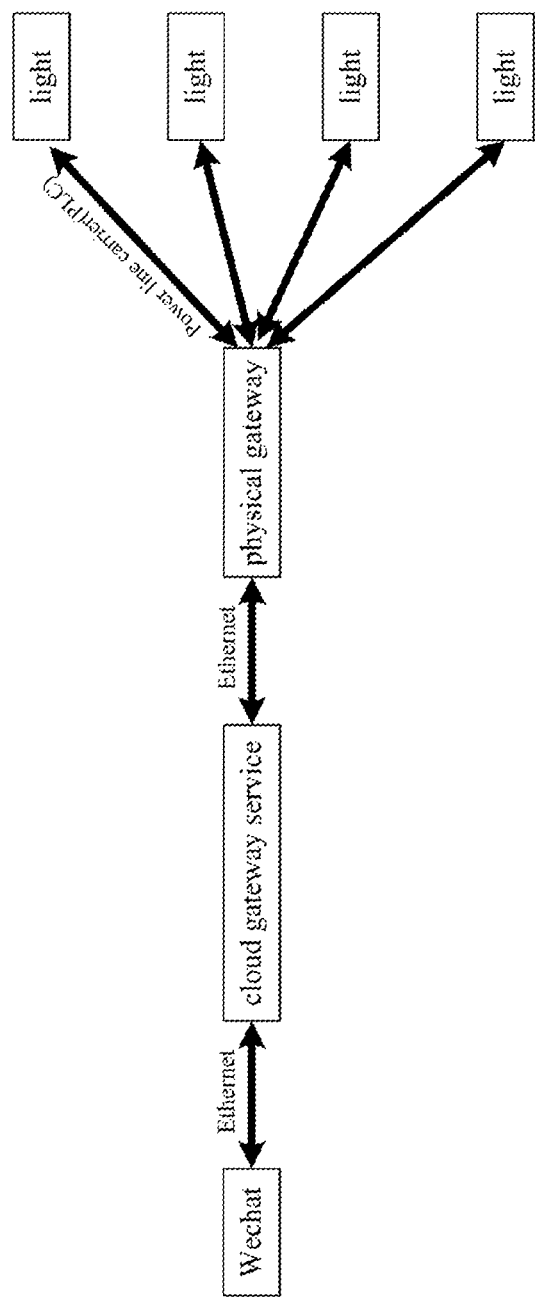
FIG. 9 is a driven diagram of the LED light of FIG. 1.

In the exemplary embodiment of the present disclosure, referring to FIG. 9, the signal between the induction module 121 and the inducting portion 52 is transmitted from a physical gateway in a wireless network by means of a power carrier PLC so as to go on or go out the LED light by sending an instruction to the power supply 5, while the wireless network is passed to the physical gateway through a cloud gateway service. Compared to a conventional key-switch control way, the driving control mode of the present disclosure is more intelligent and convenient, which can conform to the trend of the times and meet to the market changes.

Figure 10:
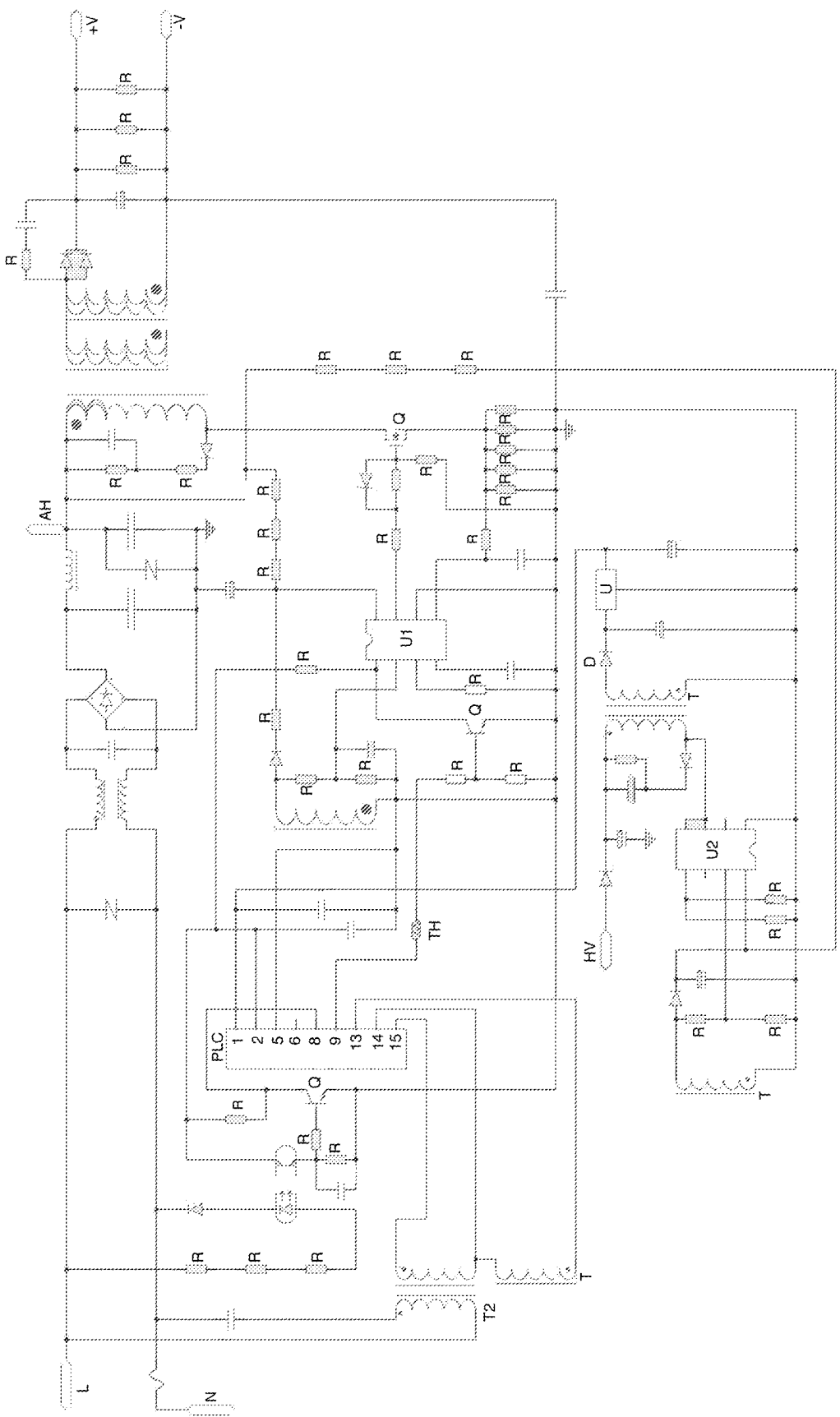
FIG. 10 is a circuit diagram of the LED light of FIG. 1.

In the exemplary embodiment of the present disclosure, referring to FIG. 10, when a control signal is input into the AC current, the control signal is sent to the thirteen input end PIN 13 through the second transformer T2, and then output PWM signals or high and low level signals to the first IC chip U1 after processed by the control board PLC. Finally, a brightness value or a direct switch is output after processed by the first IC chip U1, at the same time, the control signal is continued sending to the AC current so that it can be received by a next induction module 121 and a next inducting portion 52.

In the exemplary embodiment of the present disclosure, a plurality of mounting blocks 30 is formed in the inside of the first case 3 to cooperatively surround a ring. Correspondingly, a plurality of mounting holes 40 is formed in inside of the second case 4 to one-by-one engage with the mounting blocks 30. Such configuration of the plurality of mounting blocks 30 is defined in the first case 3, and the plurality of mounting holes 40 is correspondingly defined in the second case 4 to engage with the corresponding mounting blocks 30 for fixing the first case 3 with the second case 4 by ultrasonic fixing technology rather than by screws. Comparing to fix by the screws, such assembly is not required drilling tapping, thereby the assembly process is simple, the assembling speed is improved and the cost is decreased.

In the exemplary embodiment of the present disclosure, the heat sink 7 is a cylindrical structure with an internal hollow and the connecting cylinder 72 is a circular structure with an inner hollow. The length of the connecting tube 72 in the axial direction of the heat sink 7 is smaller than that of the through-hole 71. All the plurality of cooling units 70, the through-hole 71 surrounded by the plurality of cooling units 70, the aperture 703 formed among the plurality of cooling units 70, and the connecting tube 72 formed on the middle of the plurality of cooling units 70 and received in the through-hole 71 are mounted on the heat sink 7 of the present LED light, thereby the center of the heat sink 7 is sunk, the heat dissipation effects is improved, the overall volume of the heat sink 7 is reduced and the overall structure is stable.

In the exemplary embodiment of the present disclosure, the connecting plate 6 is connected between the heat sink 7 and the second case 4. The connecting plate 6 includes a housing 60 and a post portion 61 extending downward from the middle portion of the housing 60 along a vertical direction thereof. When assembly, the housing 60 is clasped on the heat sink 7 and the post portion 61 blocks the through-hole 71, thereby the heat generated from the heat sink 7 can be prevented from transmitting to the first case 3, the second case 4 and the power supply 5 in the receiving room 41. So, the normal working temperature of the power supply 5 is ensured and the heat generated from the heat sink 7 is avoided to make the first case 3 and the second case 4 ageing.

Furthermore, the cooling unit 70 includes a connecting portion 700 connected to the connecting tube 72, a fixing portion 701 tightly connected to the connecting plate 6 and perpendicular to the connecting portion 700, and a pair of cooling plates 702 symmetrical with each other relative to the fixing portion 701.

In the exemplary embodiment of the present disclosure, the connecting portion 700 is fixed with the connecting tube 72 by welding. The pair of cooling plates 702 is symmetrically inclined to a same angle relative to the fixing portion 701, the range of the inclined angle is between 40 degree and 70 degree. The plurality of cooling plates 702 formed between the plurality of cooling units 70 are symmetrical with each other relative to the aperture 703, thereby the heat dissipation effect is improved and the overall structure of the heat sink 7 is beautiful and practical.

Furthermore, the LED light further includes a first light plate 8 and a lampshade 9. The fixing portion 701 includes a first recess 7010 and a rib 7011 so that the first light plate 8 is slidably inserted into the first recess 7010 and then received in the first recess 7010. The lampshade 9 is engaged with the rib 7011 to enclose the first recess 7010.

Furthermore, the lampshade 9 includes a fixing sidewall 90 resisting on the first light plate 8 when the lampshade 9 is fastened with the rib 7011.

In the exemplary embodiment of the present disclosure, the first recess 7010 is provided for installing the first light plate 8. The first light plate 8 is slidably inserted into the first recess 7010 from up to down and then received in the first recess 7010, the lampshade 9 is engaged with the rib 7011 to enclose the first recess 7010. The lampshade 9 is a transparent PC cover and provided for avoiding water and dust in the air enter the first light plate 8 to corrode the first light plate 8, thereby a normal illumination and a long lifespan of the light plate 8 can be ensured.

In the exemplary embodiment of the present disclosure, the heat sink 7 is cylindrical so that the plurality of first recesses 7010 is designed to form as a circle thereamong. The amount of the first light plate 8 is same as that of the first recess 7010, that is to say, the plurality of first light plates 8 is surrounded together to cooperatively form a circle, thereby the light angle range of the first light plate 8 is between zero degree and 360 degree.

In the exemplary embodiment of the present disclosure, when the lampshade 9 is fastened with the rib 7011, the fixing sidewall 90 is resisted on the first light plate 8, thereby the fixing sidewall 90 is further fixed with the first light plate 8 to prevent the first light plate 8 from shaking in the first recess 7010 so that the normal use of the first light plate 8 is ensured.

In the exemplary embodiment of the present disclosure, the lampshade 9 is fixed with the rib 7011 by a snap-in way, which is simple and convenient operation, and with a reasonable structure.

Furthermore, the LED light further includes a wiring plate 10 connected between the second case 4 and the connecting plate 6. The wiring plate 10 is electrically connected to the first light plate 8 and the power supply 5. The first light plate 8 can pass through the connecting plate 6 and the wiring plate 10 in turn when assembly the LED light.

In the exemplary embodiment of the present disclosure, an electrical connection bridge between the first light plate 8 and the power supply 5 is provided by the wiring plate 10. The wiring plate 10 is connected between the second case 4 and the connecting plate 6, and the wiring plate 10 is received in the second case 4. That is to say, the wiring plate 10 can't be formed outside. When assembly the LED light, the port of the first light plate 8 passes through the connecting plate 6 and the wiring plate 10 in turn so that electrical connection between the first light plate 8 and the wiring plate 10 is easy to be obtained.

Furthermore, the LED light further includes a second light plate 11 perpendicular to the first light plate 8 and fixed at an end of the heat sink 7 to connect with the connecting tube 72.

In the exemplary embodiment of the present disclosure, the second light plate 11 is positioned on the bottom of the heat sink 7 and connected to the connecting tube 72 so that a downward lighting angle is provided by the second light plate 11 to further expand the luminous area of the LED light.

In the exemplary embodiment of the present disclosure, both the first light plate 8 and the second light plate 11 include a plurality of LEDs. In general, the LEDs is more, the light emitted from the first light plate 8 and the second light plate 11 is brighter. So, the LED light of the present disclosure can be selected from a high-luminous-efficiency LED light or a low-luminous-efficiency LED light.

Furthermore, the connecting portion 700 includes a second recess 7000 parallel to the first recess 7010. The second recess 7000 includes a wiring post 7001 passing through the connecting plate 6, the wiring plate 10 in turn. One end of the wiring post 7001 is electrically connected to the second light plate 11 and the other end of the wiring post 7001 is electrically connected to the wiring plate 10.

In the exemplary embodiment of the present disclosure, the surface of the connecting portion 700 is wavy to increase the contact area between the connecting portion 700 and air, thereby increasing the heat dissipation effect of the heat sink 7. The second recess 7000 is provided on the middle of the connecting portion 700 and parallel to the first recess 7010, that is to say, both the first and second recesses 7010, 7000 are longitudinal arranged on the connecting portion 700. A cross-sectional of the second recess 7000 is semicircle for conveniently receiving the wiring post 7001 therein, thereby the electrical connection between the wiring plate 10 and the second light plate 11 is obtained to avoid the problem of complicated lines therebetween.

Furthermore, the LED light further includes a baseboard 13 fixed with the base 12. The base 12 includes a mounting portion 120, each of the second light plate 11 and the baseboard 13 includes an installing hole 130 to engage with the mounting portion 120 for fixing the base 12, the baseboard 13, the second light plate 11 together with the heat sink 7.

In the exemplary embodiment of the present disclosure, the mounting portion 120 is protruded upward from the inner surface of the base 12, and the installing hole 130 is protruded toward the heat sink 7 and higher than the surface of the baseboard 13 along the extending direction of the installing hole 130. A plurality of second recesses 7000 is formed in the heat sink 7. Only one second recess 7000 is provided for receiving the wiring post 7001 therein, the rest second recesses 7000 all include an internal thread, thereby the base 12, the baseboard 13, the second light plate 11 are together fixed with the heat sink 7 via a screw passing through the installing hole 130 and the mounting portion 120 in turn.

Furthermore, the base 12 includes a plurality of cooling holes 131 formed on the middle thereof to heat dissipation, and a plurality of outlets 122 formed at the inside periphery thereof.

In the exemplary embodiment of the present disclosure, the plurality of cooling holes 131 is provided on the base 12 for conveniently cooling the heat sink 7 and cold air for convection. In addition, the plurality of outlets 122 is provided on the base 12 to prevent from splashing water in wet environment. When the water is splashed on the LED light from up to down or from down to up, the outlets 122 can effectively drain out of the water. So, the LED light can be widely used in various environments.

Furthermore, the first case 3 includes a sliding groove 31 and the connecting member 2 includes a limiting block 20 configured for limiting the sliding travel of the connecting member 2 in the sliding groove 31.

In the exemplary embodiment of the present disclosure, the limiting block 20 is provided to prevent the connecting member 2 from spinning more than one lap and avoiding breaking the internal wires in the connecting member 2 after a lot of rotation. At the same time, the limiting block 20 is provided to ensure that the LED light has sufficient torque strength to meet the torque safety requirements of the connecting member 2.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An LED light comprising:
   a holder;
   a connecting member movably connected to the holder and comprising a cylindrical hole therein;
   a first case comprising a mounting block thereon;
   a second case comprising a mounting hole to engage with the mounting block for fixing the first case with the second case;
   a power supply received in a receiving room formed between the first case and the second case, the power supply comprising a plurality of springs to cooperatively form a circle therebetween and insert into the cylindrical hole for connecting the power supply with the connecting member, and an inducting portion configured for adjusting its axial induction angle by rotating the connecting member;
   a heat sink comprising a plurality of cooling units, a through-hole cooperatively formed by the plurality of cooling units and a connecting tube connected to the plurality of cooling units;
   a connecting plate comprising a housing and a post portion extending downward from the middle portion of the housing along a vertical direction thereof, one end of the connecting plate connected to the second case and the other end of the connecting plate connected to the heat sink,
   a base comprising an induction module configured for realizing the rotation of the axial vertical plane relative to the base and inducting with the inducting portion each other to drive the LED light go on or go out; and wherein
   an aperture is formed among the plurality of cooling units, the connecting tube is received in the through-hole and the post portion is inserted into the through-hole.

2. The LED light as claimed in claim 1, wherein the cooling unit comprises a connecting portion connected to the connecting tube, a fixing portion tightly connected to the connecting plate and perpendicular to the connecting portion, and a pair of cooling plates symmetrical with each other relative to the fixing portion.

3. The LED light as claimed in claim 2, wherein the LED light further comprises a first light plate and a lampshade, the fixing portion comprising a first recess and a rib, the first light plate slidably inserted into the first recess and then received in the first recess, the lampshade engaged with the rib to enclose the first recess.

4. The LED light as claimed in claim 3, wherein the lampshade comprises a fixing sidewall resisting on the first light plate when the lampshade is fastened with the rib.

5. The LED light as claimed in claim 3, wherein the LED light further comprises a wiring plate connected between the second case and the connecting plate and electrically connected to the first light plate and the power supply, the first light plate passing through the connecting plate and the wiring plate in turn when assembly the LED light.

6. The LED light as claimed in claim 5, wherein the LED light further comprises a second light plate perpendicular to the first light plate and fixed at an end of the heat sink to connect with the connecting tube.

7. The LED light as claimed in claim 6, wherein the connecting portion comprises a second recess parallel to the first recess, the second recess comprising a wiring post passing through the connecting plate, the wiring plate in turn, one end of the wiring post electrically connected to the second light plate and the other end of the wiring post electrically connected to the wiring plate.

8. The LED light as claimed in claim 6, wherein the LED light further comprises a baseboard fixed with the base, the base comprising a mounting portion, each of the second light plate and the baseboard comprising an installing hole to engage with the mounting portion for fixing the base, the baseboard, the second light plate together with the heat sink.

9. The LED light as claimed in claim 8, wherein the base comprises a plurality of cooling holes formed on the middle thereof to heat dissipation, and a plurality of outlets formed at the inside periphery thereof.

10. The LED light as claimed in claim 1, wherein the first case comprises a sliding groove and the connecting member comprises a limiting block configured for limiting the sliding travel of the connecting member in the sliding groove.

11. The LED light as claimed in claim 1, wherein a plurality of mounting blocks is formed in the inside of the first case to cooperatively enclose a ring, a plurality of mounting holes is formed in inside of the second case to engage with the corresponding mounting blocks; the spring comprising a post and the cylindrical hole comprising a plurality of racks arranged at interval, the power supply connected with the connecting member via the post engaging with the rack under the elastic force of the spring.

12. The LED light as claimed in claim 1, wherein the signal between the induction module and the inducting portion is transmitted from a physical gateway in a wireless network by means of a power carrier PLC so as to go on or go out the LED light by sending an instruction to the power supply, while the wireless network is passed to the physical gateway through a cloud gateway service.

13. The LED light as claimed in claim 1, wherein the heat sink is a cylindrical structure with an internal hollow and the connecting cylinder is a circular structure with an inner hollow, the length of the connecting tube in the axial direction of the heat sink is smaller than that of the through-hole.

14. An LED light comprising:
a holder;
a connecting member movably connected to the holder and comprising a cylindrical hole therein;
a first case connected to the bottom of the connecting member and comprising a plurality of mounting blocks thereon;
a second case received in the first case and a receiving room formed between the first case and the second case, the second case comprising a plurality of mounting holes to engage with the corresponding mounting blocks for fixing the first case with the second case;
a power supply received in the receiving room and comprising a plurality of springs to cooperatively form a circle therebetween and insert into the cylindrical hole for connecting the power supply with the connecting member, and an inducting portion configured for adjusting its axial induction angle by rotating the connecting member;
a heat sink comprising a plurality of cooling units, a through-hole cooperatively formed by the plurality of cooling units and a connecting tube connected to the plurality of cooling units and received in the through-hole, an aperture formed among the plurality of cooling units;
a connecting plate comprising a housing and a post portion extending downward from the middle portion of the housing along a vertical direction thereof to insert into the through-hole, one end of the connecting plate connected to the bottom of the second case and the other end of the connecting plate connected to the heat sink;
a base connected to the bottom of the heat sink and comprising an induction module configured for realizing the rotation of the axial vertical plane relative to the base and inducting with the inducting portion each other to drive the LED light go on or go out; and wherein the rotation angle range of both the connecting member and the inducting portion is from zero degree to 360 degree, the induction angle of the inducting portion is 180 degree, and the rotation angle range of the induction module relative to the base is from zero degree to 150 degree.

15. The LED light as claimed in claim 14, wherein the first case comprises a sliding groove and the connecting member comprises a limiting block configured for limiting the sliding travel of the connecting member in the sliding groove, the plurality of mounting blocks formed in the inside of the first case to cooperatively enclose a ring; the spring comprising a post and the cylindrical hole comprising a plurality of racks arranged at interval, the power supply connected with the connecting member via the post engaging with the rack under the elastic force of the spring.

16. The LED light as claimed in claim 15, wherein the heat sink is a cylindrical structure with an internal hollow and the connecting cylinder is a circular structure with an inner hollow, the length of the connecting tube in the axial direction of the heat sink smaller than that of the through-hole; the cooling unit comprising a connecting portion connected to the connecting tube, a fixing portion tightly connected to the connecting plate and perpendicular to the connecting portion, and a pair of cooling plates symmetrical with each other relative to the fixing portion.

17. The LED light as claimed in claim 16, wherein the LED light further comprises a first light plate, a second light plate, a lampshade and a wiring plate, the fixing portion comprising a first recess and a rib, the first light plate slidably inserted into the first recess and then received in the first recess, the lampshade engaged with the rib to enclose the first recess; the second light plate perpendicular to the first light plate and fixed at an end of the heat sink to connect with the connecting tube, the lampshade comprising a fixing sidewall resisting on the first light plate when the lampshade is fastened with the rib; the wiring plate connected between the second case and the connecting plate and electrically connected to the first light plate and the power supply, the first light plate passing through the connecting plate and the wiring plate in turn when assembly the LED light.

18. The LED light as claimed in claim 17, wherein the connecting portion comprises a second recess parallel to the first recess, the second recess comprising a wiring post passing through the connecting plate, the wiring plate in turn, one end of the wiring post electrically connected to the second light plate and the other end of the wiring post electrically connected to the wiring plate.

19. The LED light as claimed in claim 18, wherein the LED light further comprises a baseboard fixed with the base, the base comprising a mounting portion, each of the second light plate and the baseboard comprising an installing hole to engage with the mounting portion for fixing the base, the baseboard, the second light plate together with the heat sink; while the base comprises a plurality of cooling holes formed on the middle thereof to heat dissipation, and a plurality of outlets formed at the inside periphery thereof.

20. The LED light as claimed in claim 19, wherein the signal between the induction module and the inducting portion is transmitted from a physical gateway in a wireless network by means of a power carrier PLC so as to go on or go out the LED light by sending an instruction to the power supply, while the wireless network is passed to the physical gateway through a cloud gateway service.

* * * * *